(12) United States Patent
Sprague et al.

(10) Patent No.: US 11,188,957 B1
(45) Date of Patent: Nov. 30, 2021

(54) SOCIAL PAYMENTS RECIPIENT CAPTURE

(71) Applicant: Wells Fargo Bank, N.A., San Francisco, CA (US)

(72) Inventors: Philip Sprague, Matthews, NC (US); Laura Marie Fontana, San Francisco, CA (US); Daniel A. Porter, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 768 days.

(21) Appl. No.: 15/146,376

(22) Filed: May 4, 2016

(51) Int. Cl.
| G06Q 40/00 | (2012.01) |
| G06Q 30/04 | (2012.01) |
| H04L 12/58 | (2006.01) |
| G06Q 30/06 | (2012.01) |
| G06Q 20/08 | (2012.01) |
| G06Q 50/00 | (2012.01) |

(52) U.S. Cl.
CPC ........... *G06Q 30/04* (2013.01); *G06Q 20/085* (2013.01); *G06Q 30/0613* (2013.01); *H04L 51/32* (2013.01); *G06Q 50/01* (2013.01)

(58) Field of Classification Search
CPC .................................................. G06Q 20/085
USPC .................................................... 705/35–40
See application file for complete search history.

(56) References Cited

U.S. PATENT DOCUMENTS

| 8,326,770 | B1 | 12/2012 | Weisman | |
| 8,725,635 | B2* | 5/2014 | Klein | G06Q 20/108 |
| | | | | 705/35 |
| 2012/0158589 | A1 | 6/2012 | Katzin et al. | |
| 2012/0239560 | A1* | 9/2012 | Pourfallah | G06Q 20/102 |
| | | | | 705/40 |
| 2013/0013516 | A1* | 1/2013 | Hamilton | G06Q 40/02 |
| | | | | 705/75 |
| 2014/0108247 | A1 | 4/2014 | Artman et al. | |
| 2014/0279457 | A1 | 9/2014 | Green et al. | |
| 2018/0107992 | A1* | 4/2018 | Al-Bedaiwi | G06Q 20/12 |

OTHER PUBLICATIONS

Centralized payment system using social networks account Alireza Beikverdi, InHwan Kim, JooSeok Song Department of Computer Science, 2014 IEEE Fourth International Conference on Big Data and Cloud Computing (Year: 2014).*

* cited by examiner

*Primary Examiner* — Bruce I Ebersman
*Assistant Examiner* — John A Anderson
(74) *Attorney, Agent, or Firm* — Schwegman Lundberg & Woessner, P.A.

(57) ABSTRACT

A method for performing payment transactions includes obtaining payor or payee information for a social media payment transaction and using the payor or payee information in a funds payment transaction on another system. Other systems, apparatuses, and methods are also described.

11 Claims, 8 Drawing Sheets

SOCIAL PAYMENTS RECIPIENT CAPTURE

TECHNICAL FIELD

Embodiments pertain to social media payments and person-to-person (P2P) payments, Some embodiments relate to capturing information from a social media payment to facilitate subsequent P2P payments through a financial institution.

BACKGROUND

People use bill payment services to pay bills or to transfer money to other people and businesses. Bill payment services should be easy to use.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

Financial institution customers today lead active lifestyles and appreciate flexibility in the methods in which they can provide payments. For example, it can be convenient to the financial institution customer to provide payment to a friend or other social contact via a social application. Later, the financial institution customer may wish to provide a person-to-person (P2P) payment to this same friend or other social contact, by logging into a financial institution online portal. Financial institution customers could save time and avoid frustration if the P2P payment system was able to access payee information for payments made via social applications.

Methods and systems in accordance with various embodiments provide for a customer to initiate payments, processed through the financial institution, to social media contacts using social media. As further described herein, in accordance with various embodiments, the financial institution can store payee information corresponding to these social media payments, and use the payee information to pre-populate a list of potential payees when the customer logs into the financial institution online portal to make P2P payments. Therefore, a bridge for information is created between social applications and financial institution applications and portals. In some embodiments, a financial institution customer can register his social media. accounts with his financial institution by enrolling his financial accounts in a social payment system, thereby enabling the financial institution to view the posts/messages of the customer.

Figure 1:
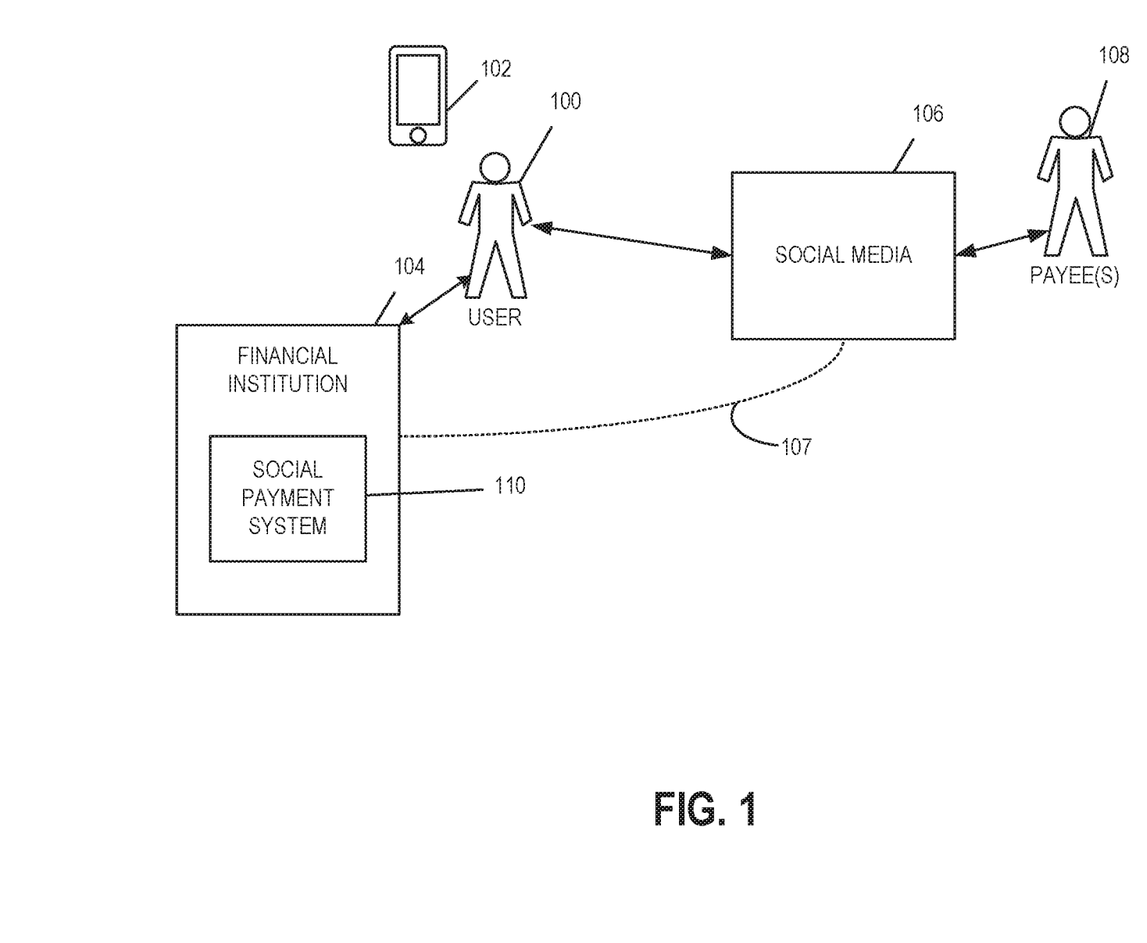
FIG. 1 illustrates a block diagram of a system in which any one or more of the techniques (e.g., methodologies) discussed herein can be performed, according to an example embodiment.

FIG. 1 illustrates a block diagram of a system in which any one or more of the techniques (e.g., methodologies) discussed herein can be performed, according to an example embodiment. As illustrated in FIG. 1, a user 100 uses a computing system 102 to perform financial transactions. The computing system 102. can include a desktop computer, mobile device, automated teller machine (ATM), wearable device, etc. Mobile devices can include various wireless devices that can communicate with the financial institution system 104. For example, mobile devices can include cellular telephones, smart phones, handheld personal communication devices, laptops, tablet computers, etc. The financial institution system 104 can include a social payment system HO for processing payments made by the user 100 using the social system 106.

People are increasingly using social applications to access social networks 106 to reach out to or keep in touch with friends, business associates, and others. Some people may belong to several different social networks 106 that may include friend networks such as, for example, those provided by Facebook™ or Twitter.™ Other social networks 106 can be used for specific purposes, for example, to connect restaurant reviewers (e.g., Yelp™) or to connect business contacts (e.g., Linkedin™). Recently, some social networks 106 have begun enabling P2P payments between users, with or without the need for users to leave the social application to either set up or schedule the payment.

Embodiments leverage one or more social networks 106 such that the social network 106 can act as an agent between the user 100 and one or more payee/s 108. In embodiments, the user 100 uses the computing system 102 to provide the financial institution system 104 with access to posts that the user 100 makes on a social network 106. The user 100 verifies and affirms that the given social media accounts belong to the user 100 and the user 100 can link various multiple social media accounts, using the computing system 102 to user 100 accounts on the financial institution system 104 using an enrollment process described later herein. The financial institution system 104 validates and ensures that the accounts are real and actually belong to the user 100, using any of the methodologies described later herein.

The financial institution system 104 can be owned and maintained at one or more financial institutions (e.g., banks, credit unions, savings and loan associations, and other institutions maintaining accounts) to access accounts held at the respective financial institution/s. Similarly, a financial account of a payee 108 can receive payment from the financial institution system 104. The computing system 102 can display a representation of the status of a financial transaction during one or more phases of the financial transaction, in real time or near real time.

Some embodiments facilitate person-to-person (P2P) payments made through an online financial institution portal by using information on payees that was gleaned during previous social media transactions. These and other embodiments can also facilitate payments to a merchant, utility, or other business (P2B). The user 100 can use his account on the social network 106 to initiate payments to payees 108 who are also registered on the social network 106 or in another similar, linked social network. In embodiments, these payees 108 are also enrolled with the same or other financial institution to receive payments according to methodologies described herein. In embodiments, the payees 108 may not hold an account into which the user 100 can deposit funds, or may not have an account enrolled, in which case systems and methods in accordance with various embodiments can prompt the payee 108 to provide account information by displaying, or causing to be displayed, a user interface in which the payee can provide account information.

In some embodiments, the financial institution system 104 can access the social media accounts of the user 100 when the user 100 enrolls his social media accounts with the financial institution system 104 as described below. In some embodiments, the user 100 can use the computing system 102 to post a message on the social network 106. In some embodiments, the social message includes posts, tweets, texts, etc., and can include information on the amount of funds to be transferred and an identity of another user to whom the funds should be transferred. The financial institution system 104 can intercept social network 106 posts before the social network 106 posts are received by the social network 106, or the social network 106 will provide the message to the financial institution system 104. In some embodiments, the identity of the user to whom funds should be transferred can be provided through a user interface, described in more detail below with reference to FIG. 2, which is displayed when the user 100 initiates a social payment transaction. In some embodiments, upon intercepting social network 106 posts or receiving an explicit user indication that a social payment is being made, the financial institution system 104 can display or cause to be displayed a payment user interface similar to that shown in FIG. 2 below.

The financial institution system 104 can use the information obtained through the social network 106 to perform subsequent financial transactions. Using information (e.g., account numbers, amounts, etc.) provided through the social network 106, the financial institution system 104 can perform later funds transfers not involving the social network 106, or take any other action described herein.

Figure 6:
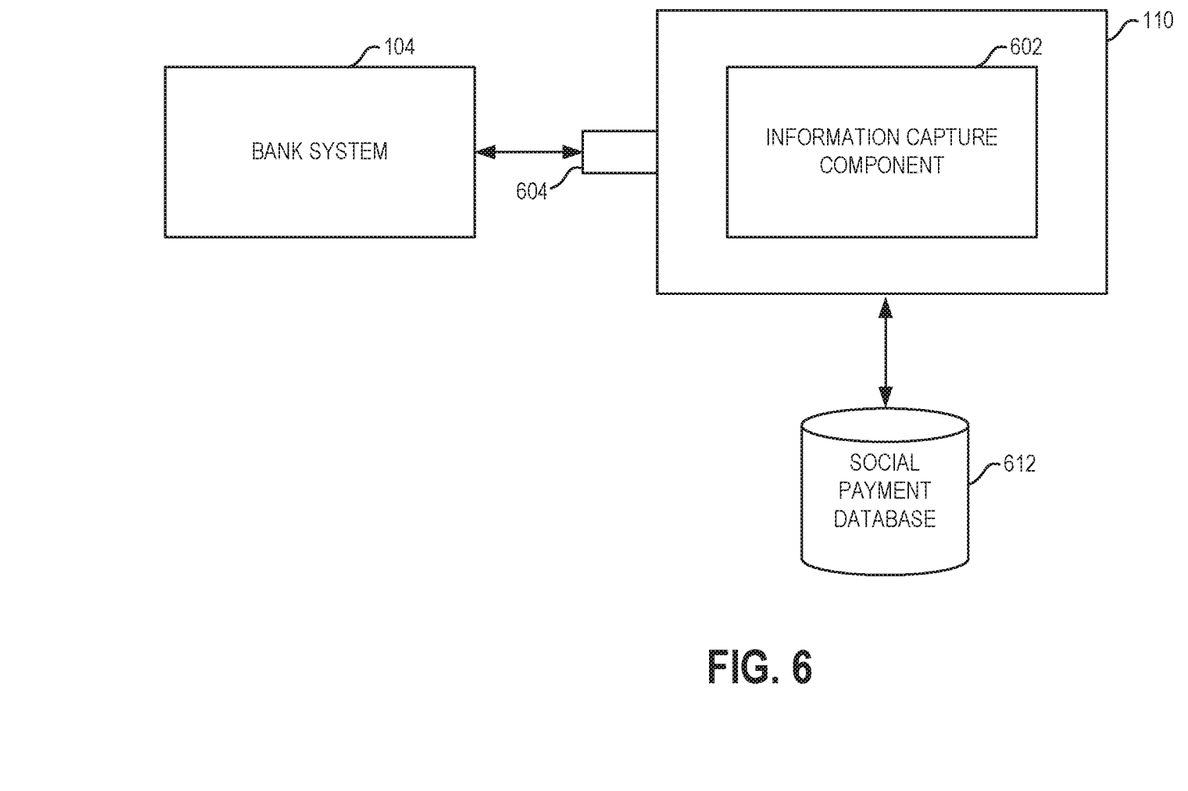
FIG. 6 is a block diagram of a social payment system, according to an example embodiment.

The social payment system 110 can store payee information, including account numbers, addresses, or other identification information in a social payment database 612 (see e.g., FIG. 6). The payee contact information and payment information can be automatically loaded and stored into a prepopulated list of payees for transactions performed via the financial institution. Accordingly, when the user 100 logs into the financial institution online banking portal to make a P2P payment, the payee is listed as a recipient for future payments without the user 100 having to enter any payee information in the online banking portal. This can save time for the user 100, as well as saving frustration that can arise when data entry errors are made.

The social payment system 110 can perform other preprocessing and setup tasks to allow for storage of payee information. For example, the social payment system 110 can generate a social payment enrollment request and provide the social payment enrollment request to the financial institution system 104. The request can be include in, e.g., a secure hypertext transfer protocol message (HTTPS) by way of example. In some embodiments, the social payment system 110 can provide a social network login request to the computing system 102. The request can include, for example, an HTML input form in which the user 100 can enter social media login information (e.g., a Facebook™ user name and password). In some embodiments, the social payment system 110 will not store this social media login information.

In some embodiments, the social network 106 can authenticate the login credentials of the user 100, and upon doing so, update the social profile of the user 100 to indicate the user 100 enrollment in the social payment system. This enrollment can indicate to the social network 106 that the social network 106 has permission to provide user 100 social information to the financial institution system 104 and/or to the social payment system 110. For example, the enrollment can indicate that the financial institution system 104 or the social payment system 110 is permitted access to user 100 social media posts, texts, messages, history, photographs, location-based information, etc. Upon receiving notification of enrollment from the social network 106 or the social payment system 110 can generate an enrollment data record and store the enrollment data record in a social payment database 612 (FIG. 6). In some embodiments, the social payment database 612 can store information regarding recent payments, payees, contexts in which payments were made, etc. The user 100 can terminate access to social media posts, texts, messages, etc. at any time.

Figure 2:
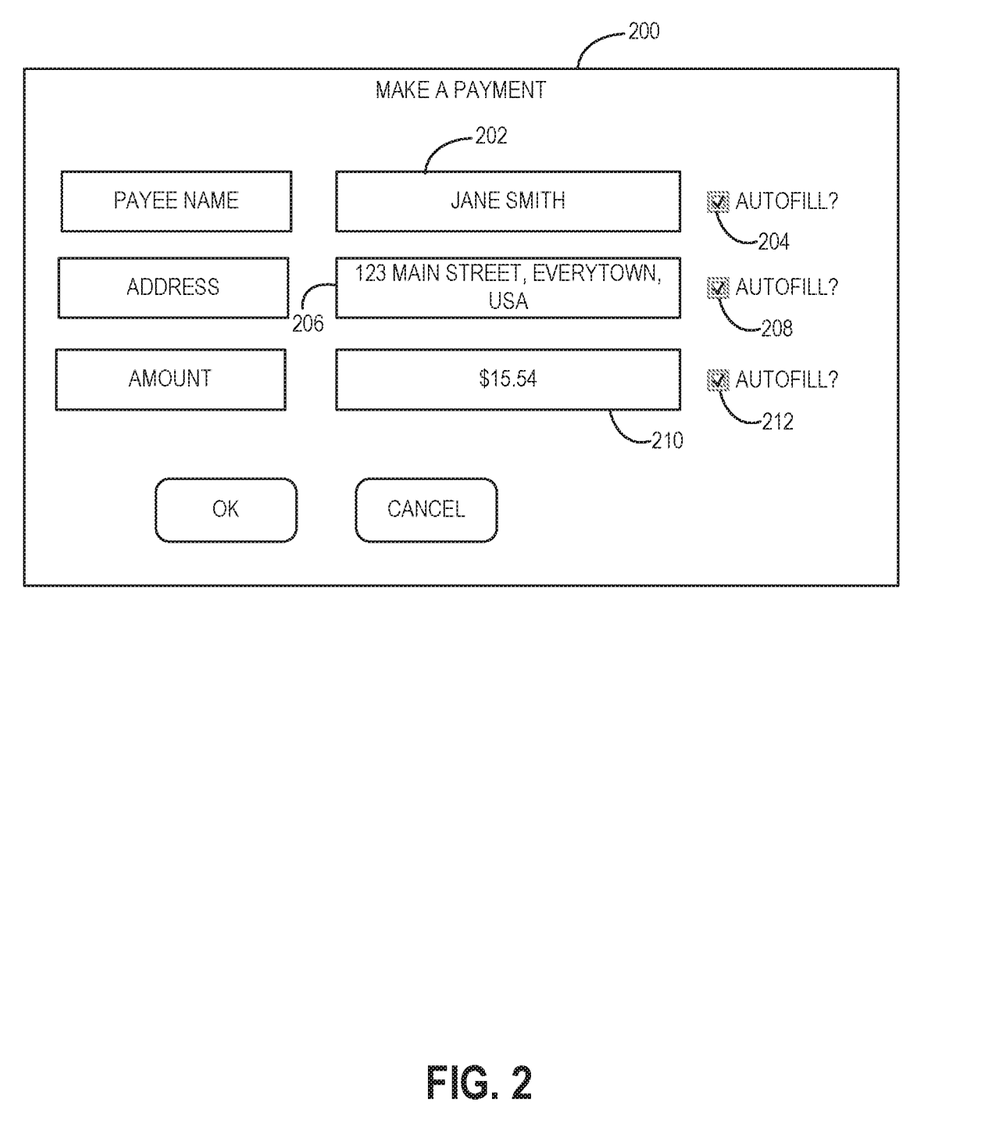
FIG. 2 is an example of a user interface for making a payment according to an example embodiment.

As briefly mentioned earlier, in some embodiments, when a user 100 initiates a payment using a social network 106, a user interface can be displayed for the user 100 to input various parameters of the payment. FIG. 2 is an example of a user interface 200 for making a payment according to an example embodiment. In some embodiments, a financial institution application programming interface (API), can display or cause to be displayed a user interface 200 similar to that shown in FIG. 2, while in other embodiments the user interface 200 can be displayed by an application associated with the social network 106. By way of illustrative example, the user 100 can make the payment using Facebook,™ and if the user 100 had previously enrolled his Facebook™ account with the financial institution's social payment system, the financial institution API can generate a user interface 200 similar to that shown in FIG. 2. In other embodiments, Facebook™ itself or other social network 106 can generate the user interface 200.

The user interface can include a Payee Name field 202 to accept a payee name. This field can be filled in automatically based on contextual cues obtained from the social network 106 via the social application. For example, if John Doe is conversing with Jane Smith via a social network 106 registered with the financial institution system 104, the financial institution system 104 can intercept John Doe's social media text, post, etc. A character string can be generated representative of the intercepted social media text, post, etc., and this character string can be parsed into fields to extract information, including the name "Jane Smith," The name "Jane Smith," therefore, can be populated into the Payee Name field 202. As Jane Smith may or may not be the actual payee to whom John Doe wishes to transfer funds, John Doe can confirm whether to proceed with payment based on the pre-populated Payee Name field 202. The user 100 can enable or disable autofill of the Payee Name field 202 using checkbox 204.

The user 100 can enter an address in the Address field 206. In some embodiments, the address can be filled in automatically based on location-based information, or by pulling social media profile information for Jane Smith, by way of example. For example, if John Doe is conversing with Jane Smith via a social network 106 registered with the financial institution system 104, the financial institution system 104 can detect the location where John Doe is during the conversation with Jane Smith by using location-based services of the social network 106. That location or address can be populated into the Address field 206. Alternatively, the financial institution system 104 can pull profile information for Jane Smith, including her address, and use that address to populate the Address field 206. As these pre-populated addresses may or may not be the actual address of Jane Smith, or the address associated with an account of Jane Smith, John Doe can confirm whether to proceed with payment based on the pre-populated Address field 206. The user 100 can enable or disable autofill of the Address field 206 using checkbox 208.

The user 100 can enter a payment amount in the Amount field 210. In some embodiments, the amount can be filled in automatically based on context around the social media posts, previous payment amounts, etc. For example, if John Doe is conversing with Jane Smith via a social network 106 registered with the financial institution system 104, the financial institution system 104 can intercept his social media text, post, etc. A character string can be generated representative of the social media text, post, etc., and this character string can be parsed into fields to extract payment amounts based on, for example, keywords, dollar signs within the posts, etc. The extracted payment amount can be populated into the Amount field 210. As this payment amount may not be the actual payment amount that John Doe wants to use for the current transaction, John Doe can confirm whether to proceed with payment based on the pre-populated Amount field 210. The user 100 can enable or disable autofill of the Amount field 210 using checkbox 212. While a Payee Name field 202, Address field 206 and Amount field 210 are shown in FIG. 2, any number of fields can be used for facilitation of social media payments.

When the user 100 selects the OK button, the user interface 200 closes and the financial institution can process the payment by, for example, withdrawing finds, in the amount specified in the Amount field 210, from the financial account of the user 100, and transferring the funds to an account associated with the payee specified in the Payee Name field 202. When the user 100 selects the Cancel button, the user interface 200 closes and no payment is initiated. In either or both cases, the financial institution API can retrieve field values for use in populating a payee list for P2P payments without the need for the user 100 to enter the payee information again. The financial institution can store the values as character strings or in any other format in a social payment database 612 (see FIG. 6) for later retrieval. Error checking or data formatting can be performed before storage or subsequently to storage in the social payment database 612 to ensure correct formatting of addresses, spell checking, etc. Further, in some embodiments no user interface 200 is used and, instead, the financial institution system 104 can retrieve fields directly from social payment messages (e.g., texts, posts, etc.) and store them in the social payment database 612.

Figure 3:
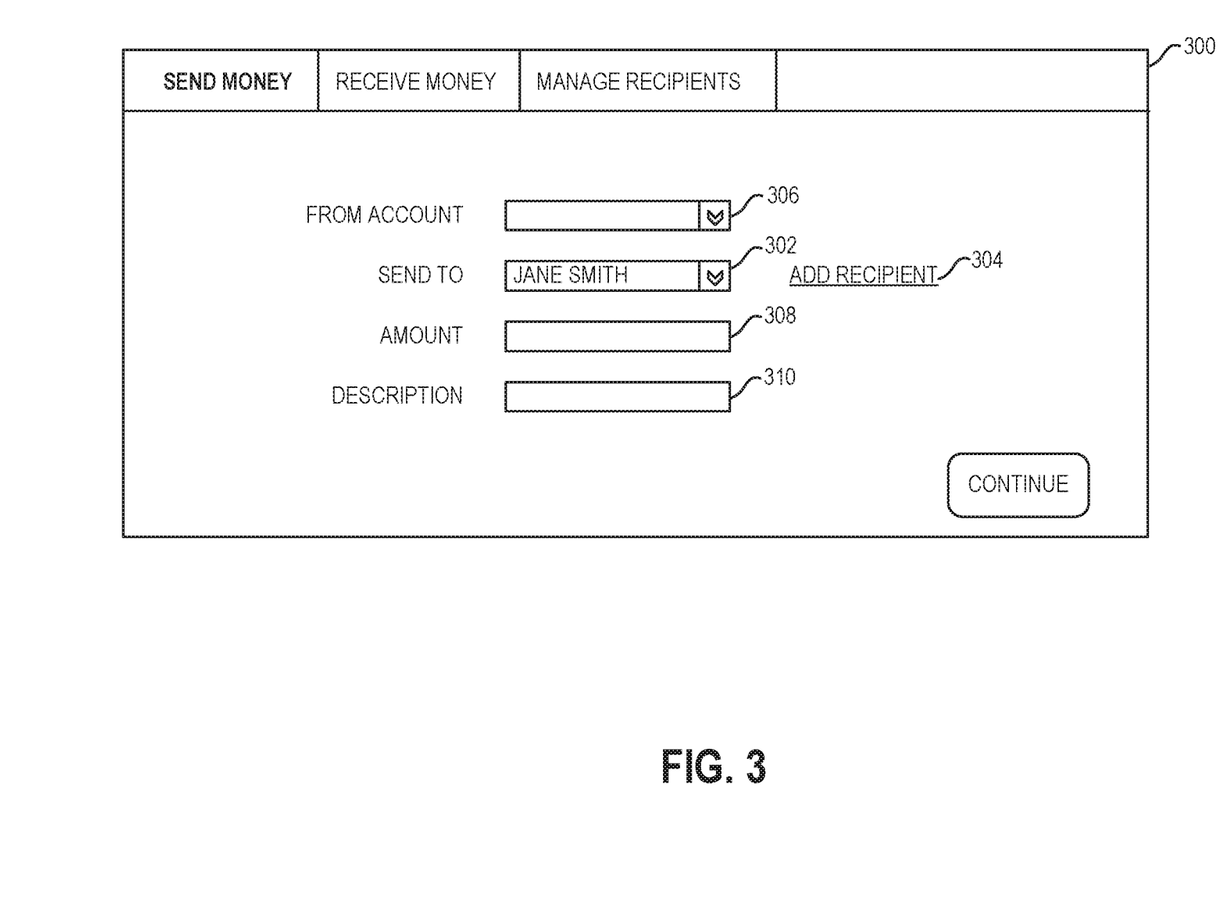
FIG. 3 is a user interface for performing a P2P payment using a financial institution system according to an example embodiment.

FIG. 3 is a user interface 300 for performing a P2P payment using a financial institution system 104 according to an example embodiment. When a user 100 subsequently logs into a financial institution system 104 P2P payment system after paying a payee using social media, the payee that was used in the Payee Name field 202 (FIG. 2) can be automatically populated into a payee list 302 for the P2P payment system. The financial institution system 104 can retrieve names to be populated into the payee list 302. from a social payment database 612. While one payee is shown in the payee list 302, any number of payees can be included in the list. The names in the payee list can be added based on previous social media payments, previous P2P payments, or by the user 100 adding a payee using the "Add Recipient" link 304. In some embodiments, the payee list 302 can be implemented as a text field, such that the user 100 can enter a partial name, with or without wildcard symbols and the financial institution system 104 will retrieve at least one match to the partial name from the social payment database 612. In some embodiments, the payee list can include nicknames, group names, business names, etc.

The example user interface 300 can include an account field 306. The account field 306 can include a list box for selecting from one or multiple accounts associated with the user 100. The multiple accounts can include savings, checking, line of credit, money market or another type of account. The selected account can be used as the source account from which payment will be debited. The example user interface 300 can include an Amount field 308, in which the user 100 can provide a payment amount for the transaction, and a Description field 310 for entering a description of the payment. In some embodiments, the Amount field 308 can be pre-populated using transaction information for previous transactions with the payee, While an Account field 306, payee list 302, Amount field 308, and Description field 310 are shown, some embodiments can include additional fields, and some embodiments can include fewer fields.

Figure 4:
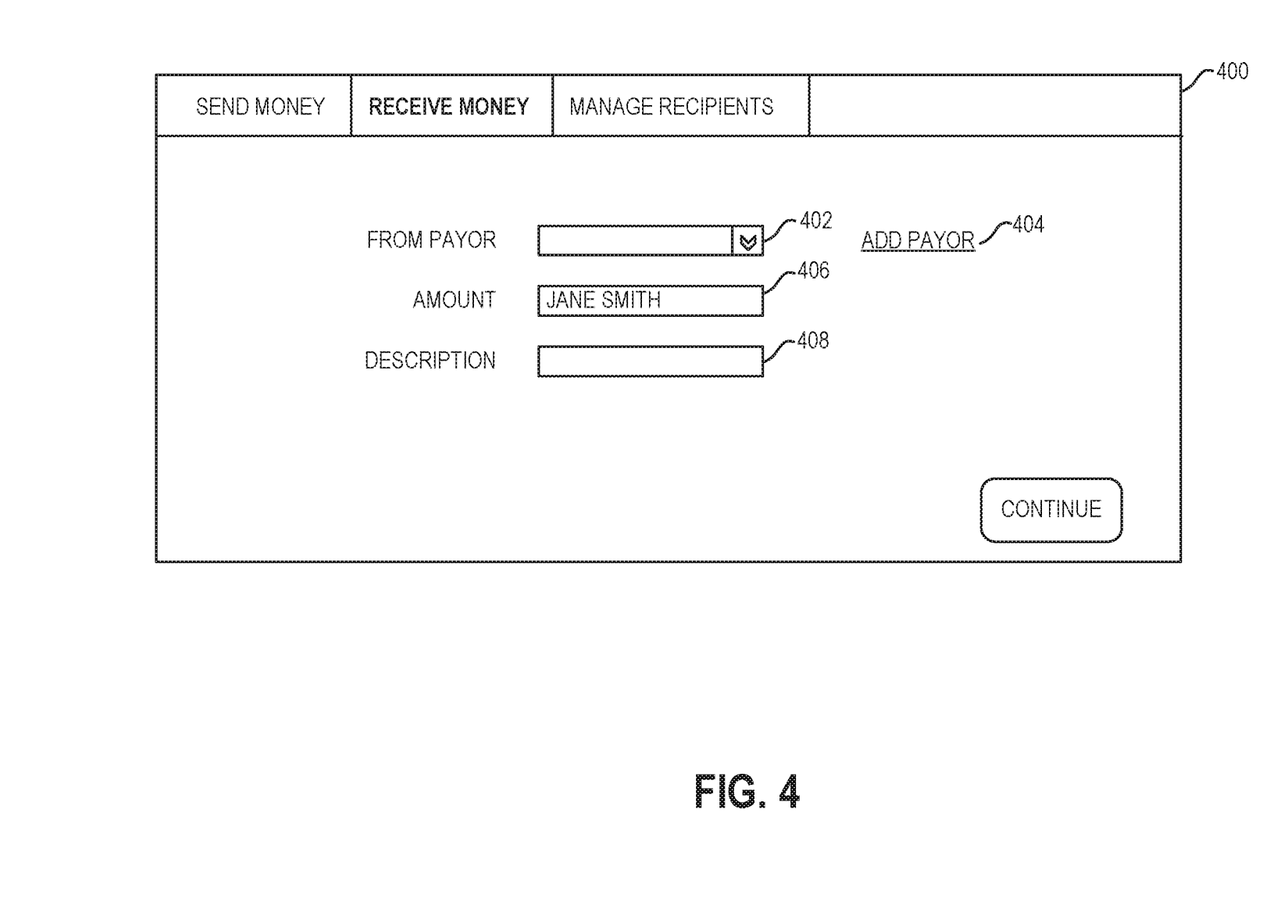
FIG. 4 is a user interface for receiving a P2P payment using a financial institution system according to an example embodiment.

FIG. 4 is a user interface 400 for receiving a P2P payment using a financial institution system 104 according to an example embodiment. When a user 100 subsequently log into a financial institution system 104 P2P payment system after paying a payee or receiving funds from a payor, the payee or payor name can be automatically populated into a payor list 402 for the P2P payment system. While one payor is shown in the list 402, any number of payors can be included in the list. The names in the payor list 402 can be added based on previous social media payments, previous P2P payments, or by the user 100 adding a payor using the "Add Payor" link 404. Similarly to the example user interface 300, the example user interface 400 can include an Amount field 406, in which the user 100 can provide a payment amount for the transaction, and a Description field 408 for entering a description of the payment.

Figure 5:
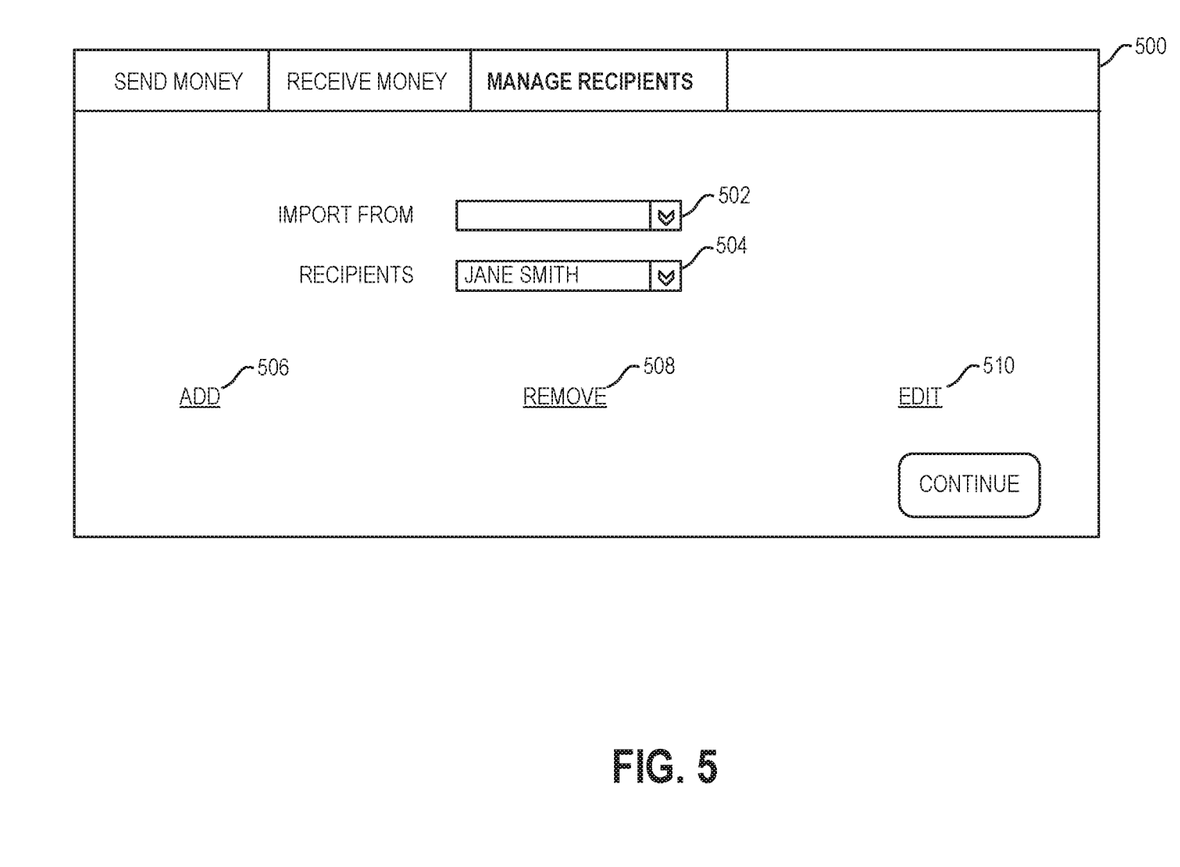
FIG. 5 is a user interface for importing payee information according to an example embodiment.

FIG. 5 is a user interface 500 for importing payee information according to an example embodiment. In embodiments, when the "Add Recipient" link 304 or the "Add Payor" link 404 is selected, the user interface 500 can be displayed. The "Import From" field 502 can include a list box or other feature for allowing a user to select a source for payee/payor information. Sources can include Facebook™, Twitter™, messaging applications, other financial institution systems, etc. When a source is selected using the "Import From" field 502, the Recipients list 504 can be populated with names of contacts, friends, previous payees, or other names pulled from the selected source. The user 100 can select a name from the Recipients list 504. The user 100 can select the "Add" link 506 to add the name selected from the Recipients list 504 to the social payment database 612 (FIG. 6). The user 100 can select the "Remove" link 508 to remove the name from the social payment database 612. The user 100 can select the "Edit" link 510 to edit information regarding the name selected from the Recipients list 504. For example, address information, account information, surname, etc. can be edited.

The user interface 500 allows the user 100 to pull information, names, etc. from social media. However, it will be appreciated that information, names, etc., can also be pushed by social media to the financial institution system 104. Further, information and names can be pulled from social media without user input. Additionally, social payment messages can be continually intercepted and parsed in real time while the user engages in social media messaging.

FIG. 6 is a block diagram of a social payment system 110, according to an example embodiment. The social payment system 110 can include one or more components that use an API to retrieve fields from a social payment user interface (e.g., user interface 200), or from other messaging (e.g., from HTML text strings, posts, instant messages, etc.). The API can then populate P2P payment user interface fields (e.g., fields of user interface 300 and/or of user interface 400).

The social payment system 110 can include one or more processors that implement or execute various social payment components and algorithms. For example, the processor can implement an information capture component 602 to obtain strings representative of fields of the user interface 200 (FIG. 2). The information capture component 602 can receive text strings, over the network port 604, from the financial institution system 104 (which the financial institution system 104 can receive from social networks 106 through interaction with the user 100 (FIG. 1) with or without using a user interface similar to that shown above in FIG. 2). The information capture component 602 can identify a payee name and other payee identification information (e.g., address, payee account, etc.) from those text strings. Once payee name and other payee identification information is obtained, the information capture component 602 can provide the payee name and other payee identification information to the financial institution system 104 over the network port 604, or for storage in the social payment database 612.

A social payment database 612 can store social payment enrollment information. For example, an entry of the social payment database 612 can include a financial account number, and a list of one or more social networks 106 from which the user 100 is authorizing payments. The social payment database 612 can store information regarding payees, such as payee names, aliases, account information, addresses, etc., for population of a payee list 302.

The social payment system 110 can include other components (not shown in FIG. 6) to access account-related data to identify other transactions that can be linked to the same account or associated user (e.g., by associating similar names, addresses and other identifying data) or for accessing and analyzing account history for accounts, on either the payee or payor side of the transaction.

Figure 7:
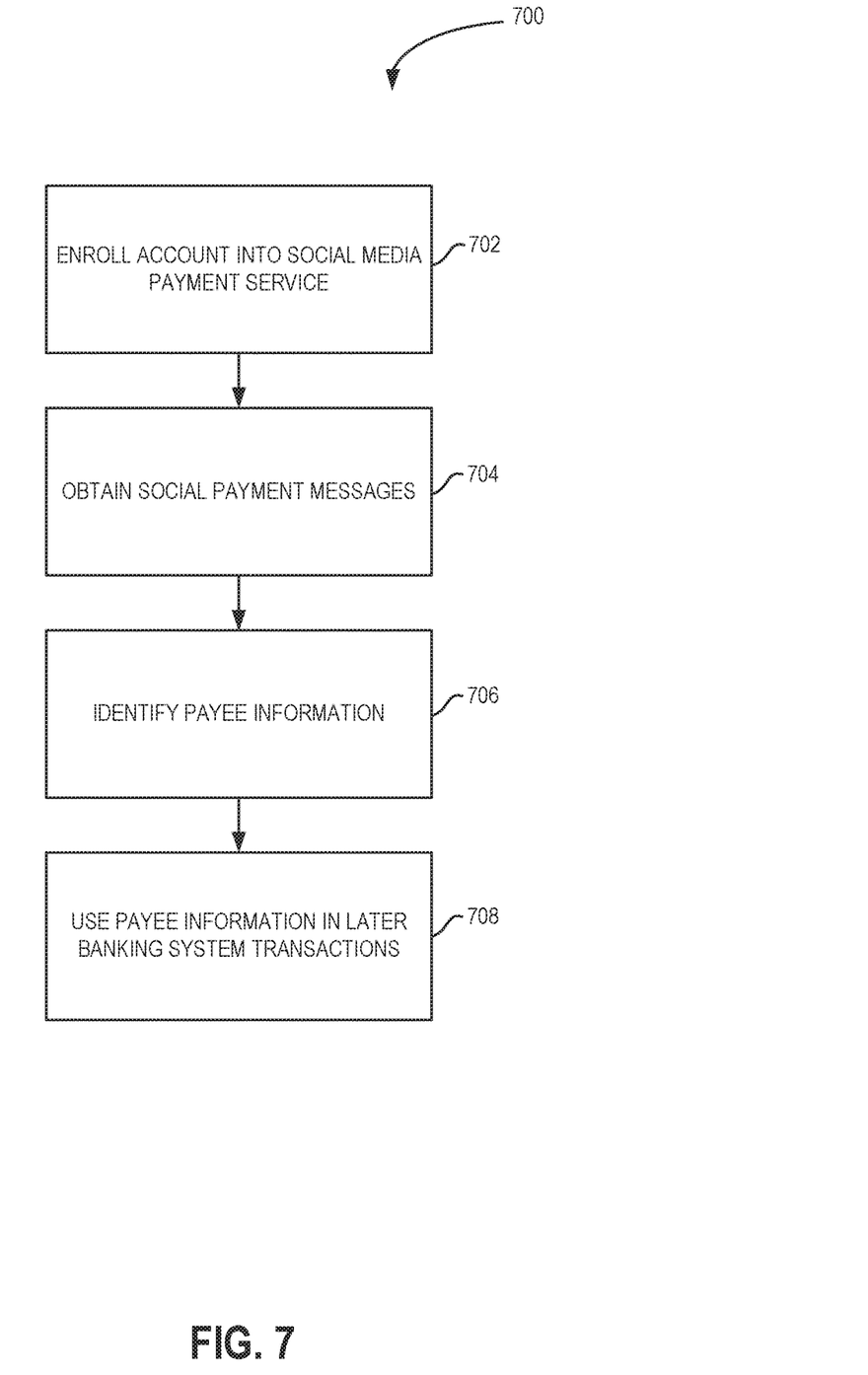
FIG. 7 shows a flowchart of a method of capturing information associated with a social media payment, according to an example embodiment.

FIG. 7 illustrates a method 700 of performing a P2P payment based on information provided in a social media payment, according to an example embodiment. A financial institution system 104, including components of the social payment system 110 or other financial institution system 104 components or databases, can perform one or more of the operations of method 700.

The example method 700 begins at operation 702, with enrolling at least one financial account of a user 100 and a social network 106 into a social media payment service. Enrollment information can be stored in, for example, the social payment database 612 (FIG. 6) or other database.

The example method 700 continues with operation 704 with obtaining a social payment message generated by the user 100 on the social network 106.

The example method 700 continues with operation 706 with identifying payee information within the social payment message. Operation 706 can be performed by parsing a social payment message into one or more strings, and extracting a payee name from the string/s. Other payee-identifying parameters can be extracted, such as nicknames, address, and account information. Context cues derived from the corresponding social payment message, such as the relationship to the user 100, job title, etc., can be included with other payee-identifying parameters. Context cues can also be derived from location-based information of the user, of a payee associated with the payee information, of the location where the payment is made, etc. The payee name and other payee-identifying parameter/s can be stored in the social payment database 612 or other database associated with the financial institution system 104.

The example method 700 continues with operation 708 with using the payee information within the social payment message to complete a payment transaction initiated on a financial institution system 104 separate from the social network 106, thereby providing an information bridge 107 between the social network 106 and the financial institution system 104.

In some embodiments, the payee name and/or other payee-identifying parameter can be updated based on subsequently retrieved social payment messages, user input, subsequently completed financial transactions, etc. The payee name and other payee-identifying parameter can be identified based on contextual cues derived from a context of the corresponding social payment message. In some embodiments, the example method 700 can include providing a suggested payment amount for the payment transaction initiated on the financial institution system 104 based on previous social media transactions with the payee.

In sonic embodiments, the example method 700 can include obtaining an incoming social payment message indicating that the user 100 has been paid by a payor on the social network 106. Payor information can be identified from this incoming social payment message, and the payor information can be stored to be used as payee information for a payment transaction initiated on the financial institution system 104.

Figure 8:
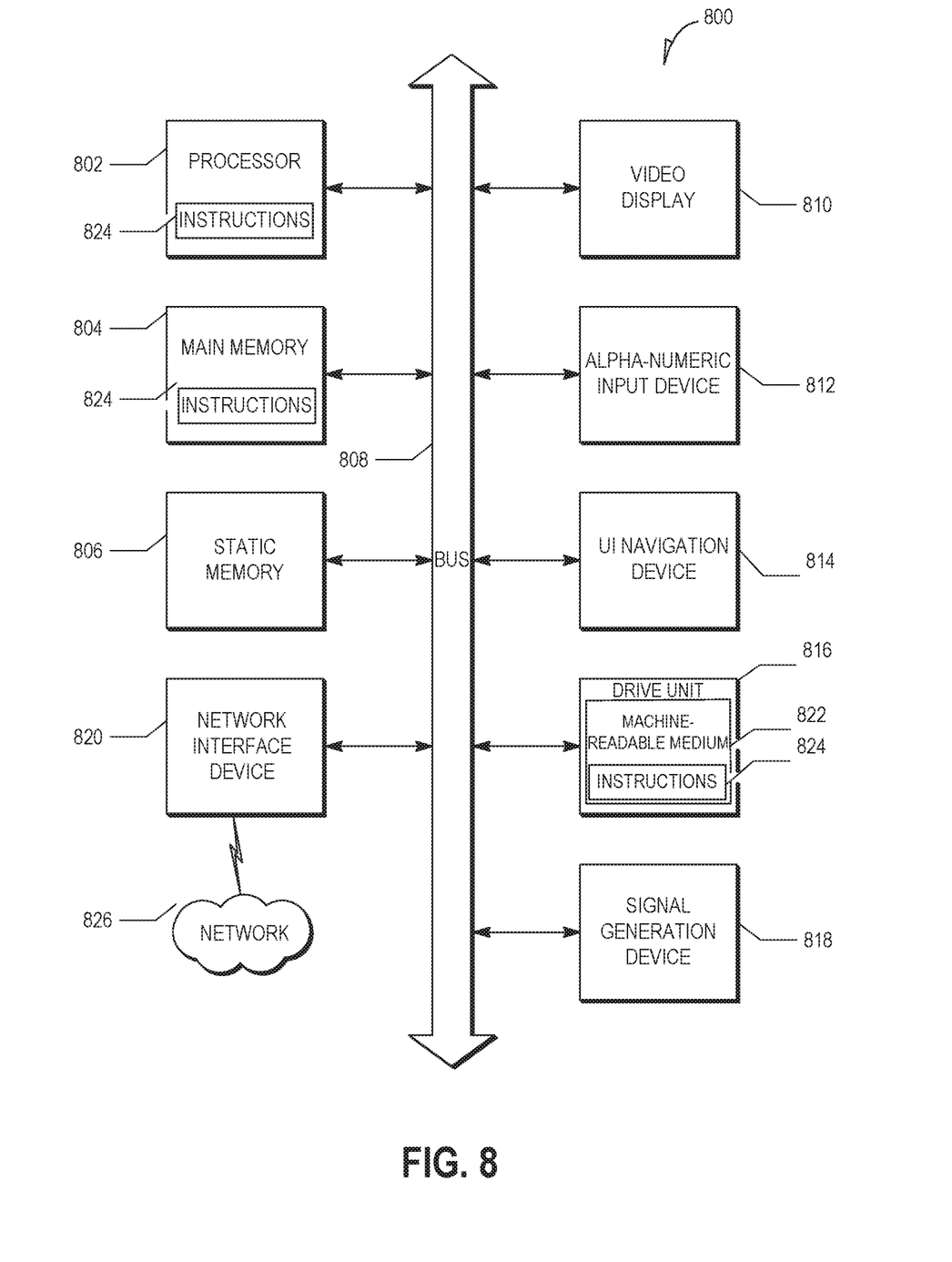
FIG. 8 is a block diagram illustrating an example machine upon which any one or more of the techniques (e.g., methodologies) discussed herein can be performed, according to an example embodiment.

FIG. 8 is a block diagram illustrating components of the computing system 102 or the financial institution system 104 according to some example embodiments, able to read instructions 824 from a machine-readable medium (e.g., a machine-readable storage medium) 802 and perform any one or more of the methodologies discussed herein. Specifically, FIG. 8 shows a diagrammatic representation of the computing system 102 or the financial institution system 104 in the example form of a computer system and within which instructions 824 (e.g., software) for causing the computing system 102 or the financial institution system 104 to perform any one or more of the methodologies discussed herein can be executed.

In alternative embodiments, the computing system 102 or the financial institution system 104 operates as a standalone device or can be connected (e.g., networked) to other machines. In a networked deployment, the computing system 102 or the financial institution system 104 can operate in the capacity of a server machine or a client machine in a server-client network environment, or as a peer machine in a peer-to-peer (or distributed) network environment. The computing system 102 or the financial institution system 104 can be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein. For example, when acting as a social payment system 110, the instructions 824 can cause social payment system 110 to perform operations including enrolling at least one financial account of a user of a social network 106 into a social media payment service; obtaining social payment messages generated by the user on the social network 106; identifying payee information within the social payment messages; and using the payee information within the social payment messages to complete a payment transaction initiated on a financial institution system 104 separate from the social network 106.

The computing system 102 or financial institution system 104 includes at least one processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The computing system 102 or financial institution system 104 can further include a graphics display 810 (e.g., a plasma display panel (PDP), a light emitting diode (LED) display, a liquid crystal display (LCD), a projector, or a cathode ray tube (CRT)). The graphics display 810 can display any data associated with bank accounts, such as account balances, advertisements for additional services, geographically specific data, etc. The computing system 102 or financial institution system 104 can also include an alphanumeric input device 812 (e.g., a keyboard), a cursor control device 814 (e.g., a mouse, a touchpad, a trackball, a joystick, a motion sensor, or other pointing instrument), a storage unit 416, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 can also reside, completely or at least partially, within the main memory 804, within the processor 802 (e.g., within the processor's cache memory), or both, during execution thereof by the computing system 102 or the financial institution system 104. Accordingly, the main memory 804 and the processor 802 can be considered as machine-readable media. The instructions 824 can be transmitted or received over a network 826 via the network interface device 820.

As used herein, the term "memory" refers to a machine-readable medium able to store data temporarily or permanently and can be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing instructions (e.g., software) 824 for execution by a machine (e.g., the computing system 102 or the financial institution system 104 (FIG. 1)), such that the instructions 824, when executed by one or more processors of the machine (e.g., processor 802 or processors for the social payment system 110 (FIG. 1)), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Certain embodiments are described herein as including logic or a number of components, modules, or mechanisms. Modules can constitute either software modules (e.g., code embodied on a non-transitory machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a field programmable gate array (FPGA) or an ASIC. A hardware module can also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, a processor being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least sonic of the operations can be performed by a group of computers (as examples of machines including processors), with these operations being accessible via a network (e.g., the Internet) and via one or more appropriate interfaces an application program interface (API)).

The performance of certain of the operations can be distributed among the one or more processors, not only residing within a single machine, but also deployed across a number of machines. In some example embodiments, the one or more processors or processor-implemented modules can be located in a single geographic location (e.g., within a home environment, an office environment, or a server farm). In other example embodiments, the one or more processors or processor-implemented modules can be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities can take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like can refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance.

What is claimed is:

1. A computer-implemented method, comprising:
    enrolling, at a computer system, at least one financial account of a user of a social network into a social media payment service;
    obtaining, at the computer system, a social payment message for a first transaction generated by the user on the social network;
    identifying, by the computer system, a payee name and at least one other payee-identifying parameter associated with payee information based on a contextual cue derived from a context within the social payment message, the contextual cue including location-based information of the user or of a payee associated with the payee information, wherein identifying the payee name and the at least one other payee-identifying parameter includes:
        parsing, at the computer system, the social payment message into one or more strings; and
        extracting, at the computer system, the payee name and the at least one other payee-identifying parameter from the one or more strings;
    storing the payee name and the at least one other payee-identifying parameter in a payment database;
    updating, at the computer system, at least one of the payee name or the at least one other payee-identifying parameter based on subsequently obtained social payment messages;
    retrieving, at the computer system, the payee information from the payment database and using the payee information within the social payment message to populate a field of a user interface displayed on a display device associated with an online financial institution portal to complete a subsequent payment transaction separate from the first transaction and initiated on the online financial institution portal; and automatically populating the field of the user interface with the payee information based on previous social media payments made by the user and the contextual cue.

2. The method of claim 1, further comprising:
updating at least one of the payee name or the at least one other payee-identifying parameter based on a user input made in the user interface provided by the computer system.

3. The method of claim 1, further comprising:
providing a suggested payment amount for the payment transaction initiated on the computer system based on previous social media transactions with a payee.

4. The method of claim 1, further comprising:
obtaining a social payment message indicating that the user has been paid by a payor on the social network;
identifying payor information with the social payment message; and
storing the payor information to be used as payee information for a payment transaction initiated on the computer system.

5. The method of claim 1, further comprising:
importing a set of contacts from a social media account associated with the user into the computer system; and
storing the set of contacts as a set of payees for payment transactions initiated on the computer system.

6. The method of claim 1, wherein the obtaining of the social payment message comprises:
intercepting the social payment message while the user engages in social media messaging on the social network.

7. The method of claim 6, wherein the social payment message is pulled from the social network by the computer system.

8. The method of claim 6, wherein the social payment message is pushed to the computer system by the social network.

9. A system comprising:
a storage device storing enrollment information for financial accounts, the enrollment information linking respective financial accounts to at least one social network;
at least one processor;
a network interface device to communicate with the at least one social network; and
the storage device further storing instructions, which when executed by the at least one processor, configure the at least one processor to:
receive input to enroll at least one financial account of a user of a social network into a social media payment service;
obtain a social payment message for a first transaction generated by the user on the social network;
identify a payee name and at least one other payee-identifying parameter associated with payee information based on a contextual cue derived from a context within the social payment message the contextual cue including location-based information of the user or of a payee associated with the payee information, wherein the at least one processor is further configured to identify the payee name and the at least one other payee-identifying parameter by:
parsing the social payment message into one or more strings; and
extracting the payee name and the at least one other payee-identifying parameter from the one or more strings;
store the payee name and the at least one other payee-identifying parameter in a payment database:
update at least one of the payee name or the at least one other payee-identifying parameter based on subsequently obtained social payment messages;
retrieve the payee information from the payment database and use the payee information within the social payment message to populate a field of a user interface displayed on a display device associated with an online financial institution portal to complete a subsequent payment transaction separate from the first transaction and initiated on the online financial institution portal; and
automatically populate the field of the user interface is with the payee information based on previous social media payments made by the user and the contextual cue.

10. A non-transitory machine-readable medium comprising instructions that, when executed by at least one processor, cause the at least one processor to perform operations, the operations comprising:
enrolling at least one financial account of a user of a social network into a social media payment service;
obtaining a social payment message for a first transaction generated by the user on the social network;
identifying payee a payee name and at least one other payee-identifying parameter associated with payee information based on a contextual cue derived from a context within the social payment message, the contextual cue including location-based information of the user or of a payee associated with the payee information, wherein identifying the payee name and the at least one other payee-identifying parameter comprises:
parsing the social payment message into one or more strings; and
extracting a payee name and the at least one other payee-identifying parameter from the one or more stings;
storing the payee name and the at least one other payee-identifying parameter in a payment database;
updating at least one of the payee name or the at least one other payee-identifying parameter based on subsequently obtained social payment messages;
retrieving the payee information from the payment database and using the payee information within the social payment message to populate a field of a user interface displayed on a display device associated with an online financial institution portal to complete a subsequent payment transaction separate from the first transaction and initiated on the online financial institution portal; and
automatically populating the field of the user interface is with the payee information based on previous social media payments made by the user and the contextual cue.

11. The non-transitory machine-readable medium of claim 10, wherein the instructions cause the at least one processor to perform further operations comprising:
updating at least one of the payee name or the at least one other payee-identifying parameter based on a user input.

\* \* \* \* \*

UNITED STATES PATENT AND TRADEMARK OFFICE
CERTIFICATE OF CORRECTION

PATENT NO. : 11,188,957 B1  
APPLICATION NO. : 15/146376  
DATED : November 30, 2021  
INVENTOR(S) : Sprague et al.

Page 1 of 1

It is certified that error appears in the above-identified patent and that said Letters Patent is hereby corrected as shown below:

In the Claims

In Column 14, Line 40, in Claim 10, delete "stings;" and insert --strings;-- therefor Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*